United States Patent
Kim et al.

(10) Patent No.: US 10,882,433 B2
(45) Date of Patent: Jan. 5, 2021

(54) CONSOLE HAVING A CUP HOLDER

(71) Applicants: HYUNDAI MOTOR COMPANY, Seoul (KR); KIA MOTORS CORPORATION, Seoul (KR)

(72) Inventors: Min Han Kim, Gunpo-si (KR); Dong Ho Shin, Seoul (KR); Keun Chul Lee, Anyang-si (KR); Jung Yup Lee, Seongnam-si (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 86 days.

(21) Appl. No.: 16/200,143

(22) Filed: Nov. 26, 2018

(65) Prior Publication Data

US 2020/0070708 A1 Mar. 5, 2020

(30) Foreign Application Priority Data

Aug. 31, 2018 (KR) .......................... 10-2018-0103170

(51) Int. Cl.
*B60N 3/10* (2006.01)

(52) U.S. Cl.
CPC ............. *B60N 3/102* (2013.01); *B60N 3/103* (2013.01)

(58) Field of Classification Search
CPC .................................. B60N 3/102; B60N 3/103
USPC .......................................................... 296/37.8
See application file for complete search history.

(56) References Cited

U.S. PATENT DOCUMENTS

| 7,290,678 B2 * | 11/2007 | Park | ....................... | B60N 3/106 |
| | | | | 220/737 |
| 2005/0000991 A1 * | 1/2005 | Kogami | ................. | B60N 3/102 |
| | | | | 224/483 |

* cited by examiner

*Primary Examiner* — Joseph D. Pape
*Assistant Examiner* — Dana D Ivey
(74) *Attorney, Agent, or Firm* — Lempia Summerfield Katz LLC

(57) ABSTRACT

A console has a separable cup holder in which the mounting height of the separable cup holder can be adjusted depending on the height of a beverage container to be stored therein. The position of the separable cup holder can be slidingly moved to store beverage containers with a large volume and diameter or a small volume and diameter, as well as other small items, by allowing the separable cup holder to be coupled to the console space such that the height and front and rear positions are adjustable.

10 Claims, 11 Drawing Sheets

[FIG. 1]
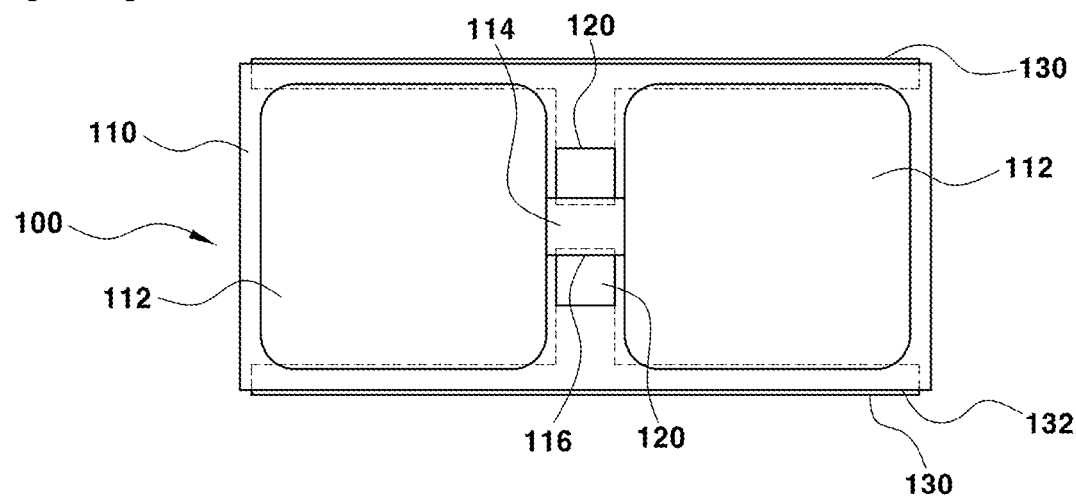
[FIG. 2]
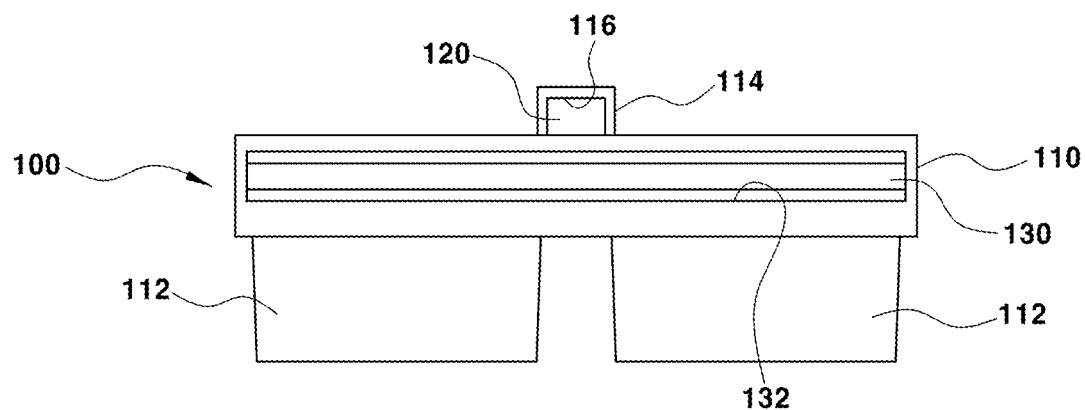

【FIG. 3】
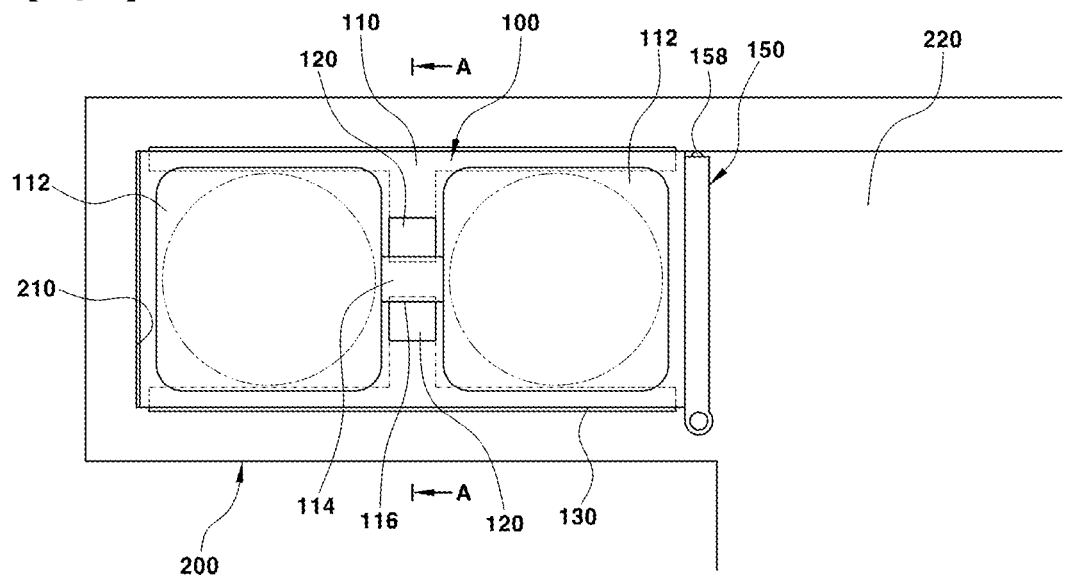
【FIG. 4】
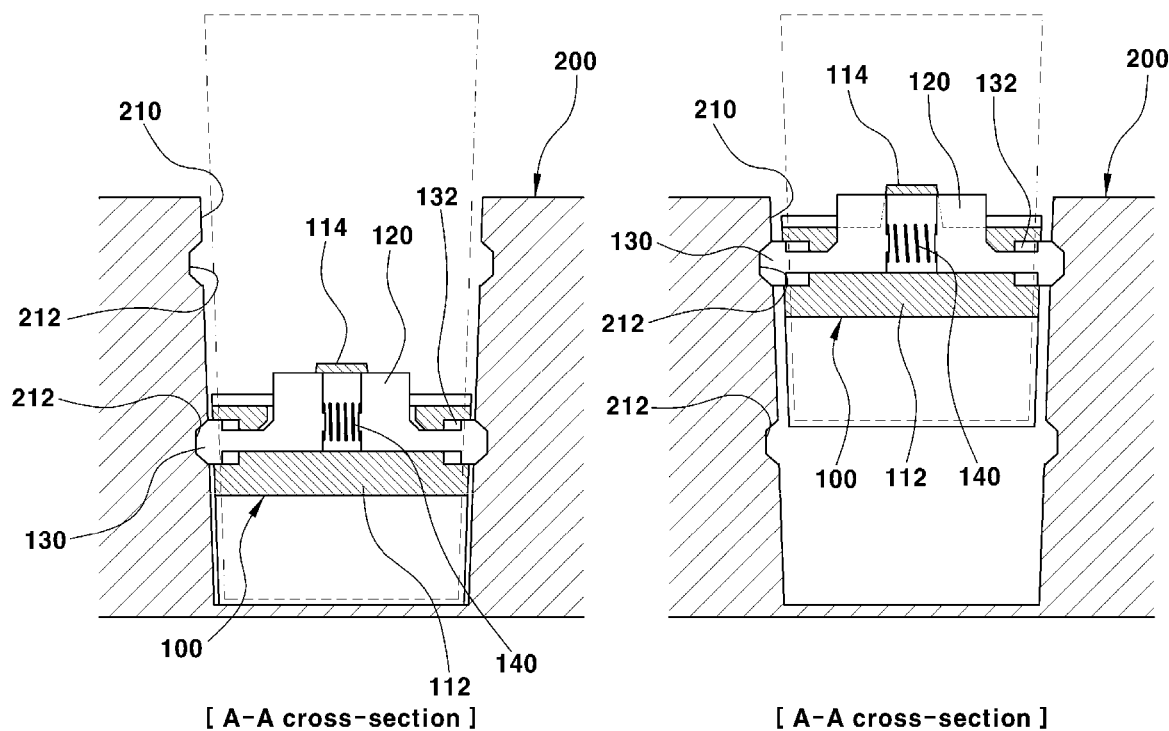
[ A-A cross-section ]     [ A-A cross-section ]

[FIG. 5]
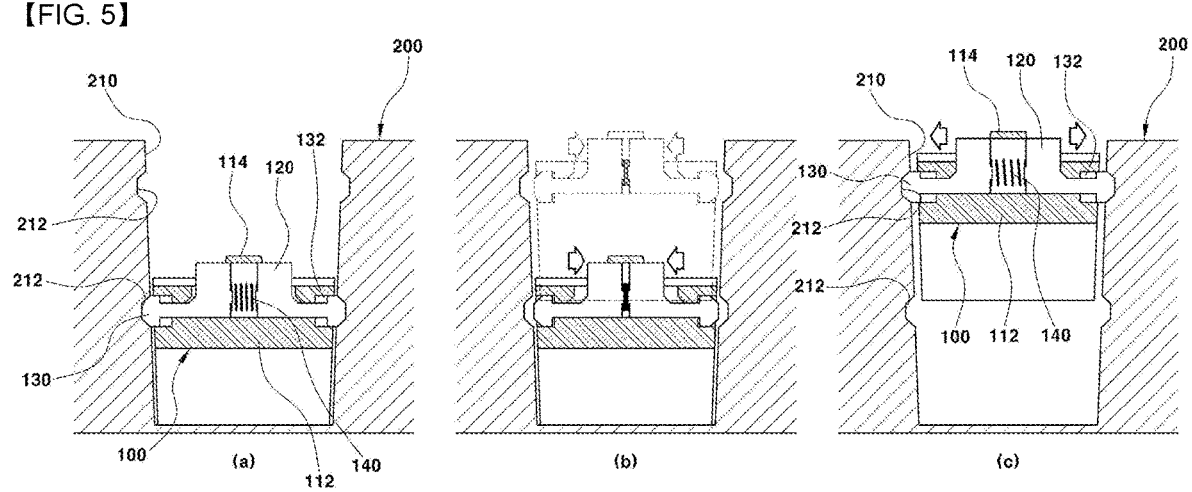

[FIG. 6]
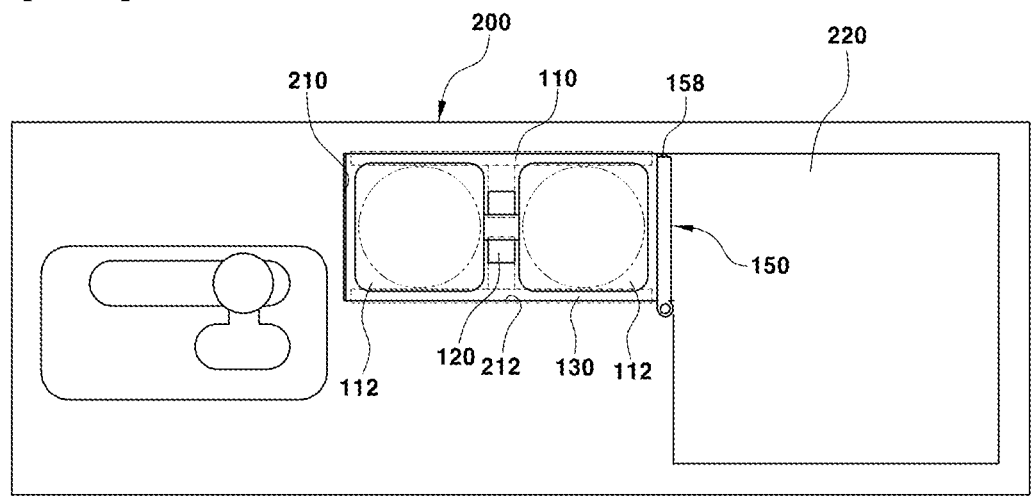
[FIG. 7]
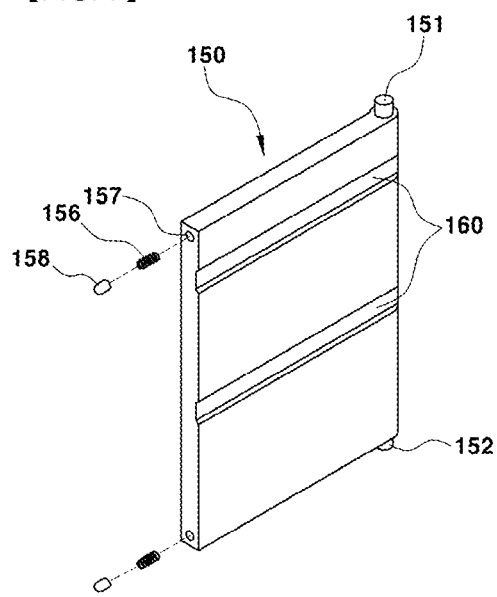

[FIG. 8]
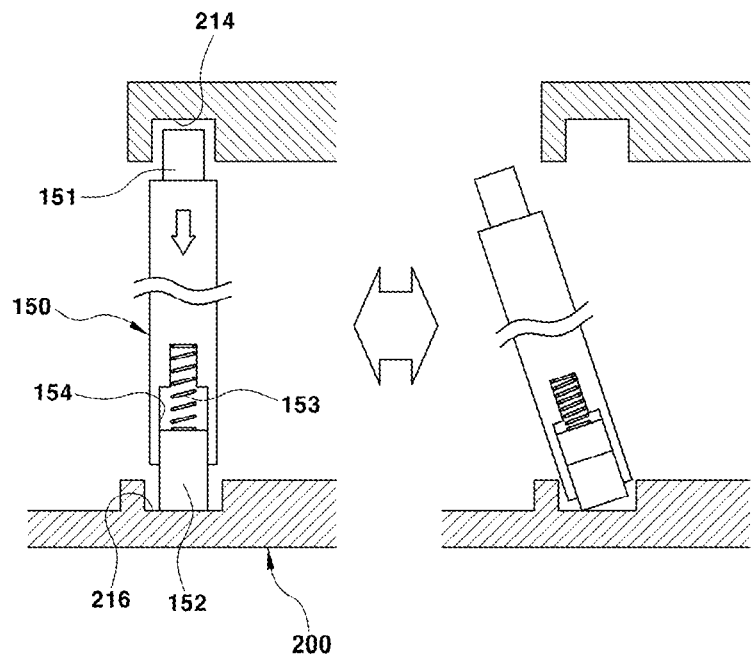
[FIG. 9]
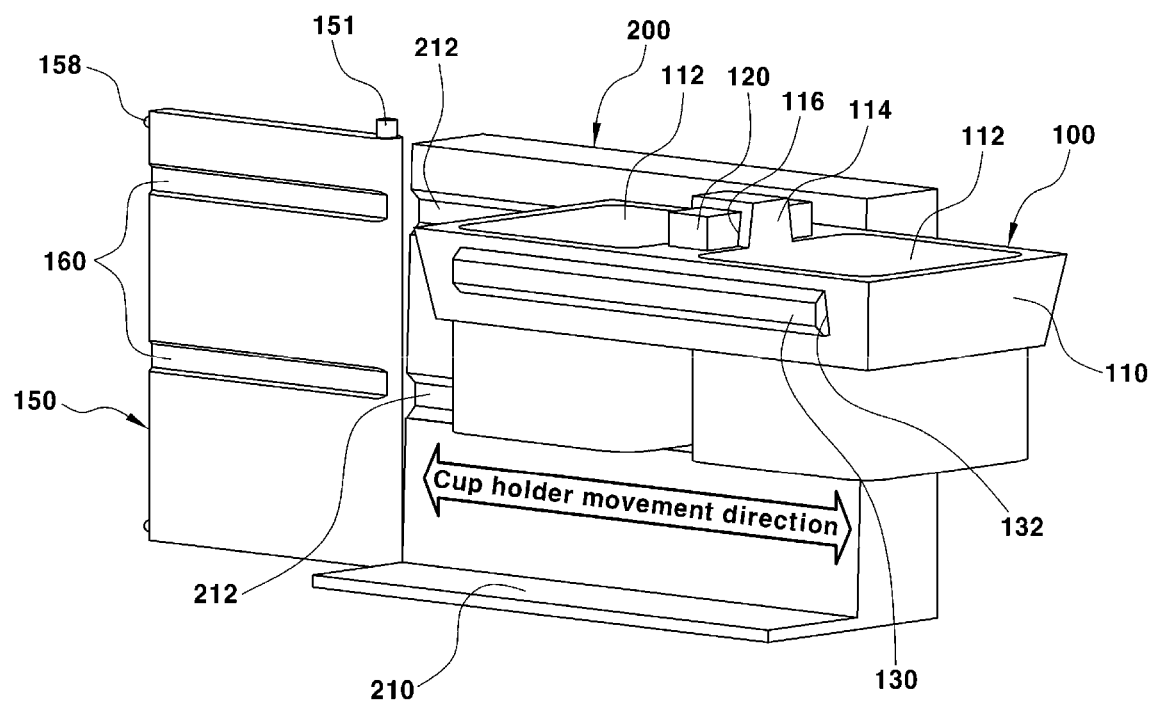

[FIG. 10]
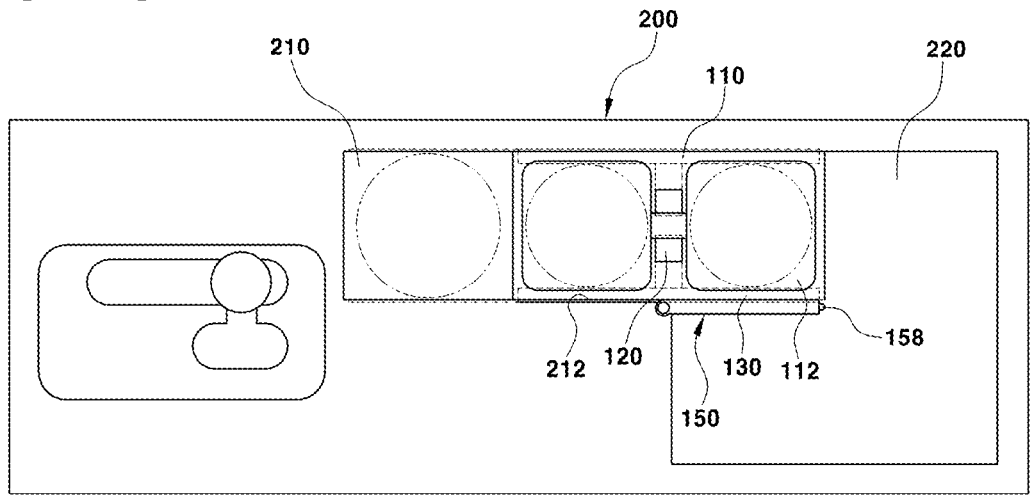
[FIG. 11A]
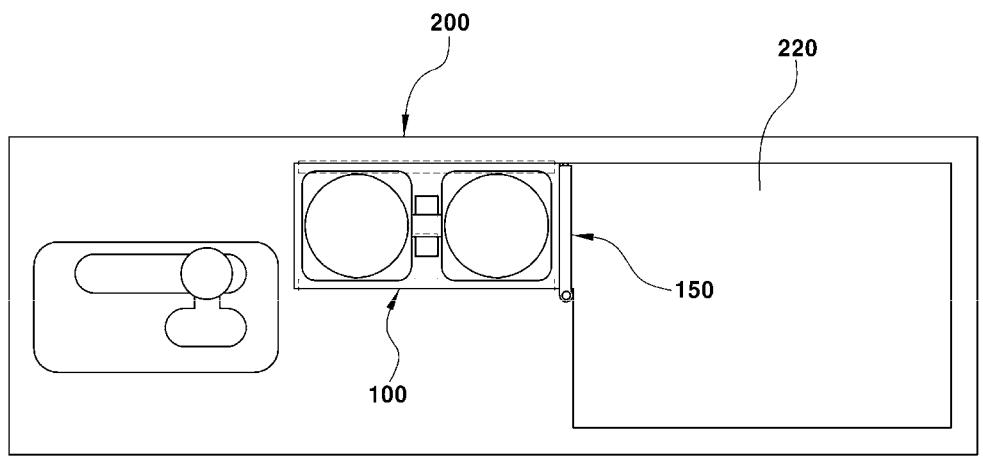
[ Basis (cup holder frontmost / shutter guide closure) ]

【FIG. 11B】
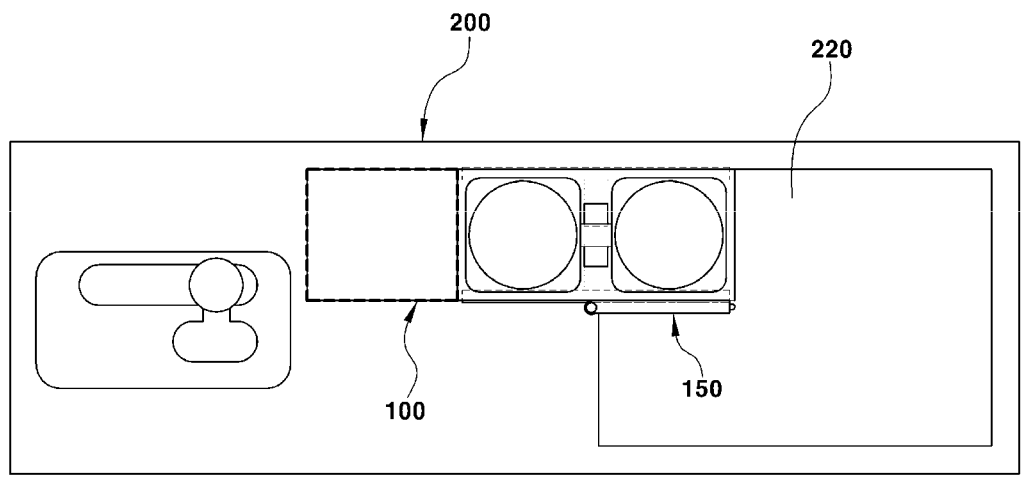
[ Cup holder slide (shutter guide rotation) ]
【FIG. 11C】
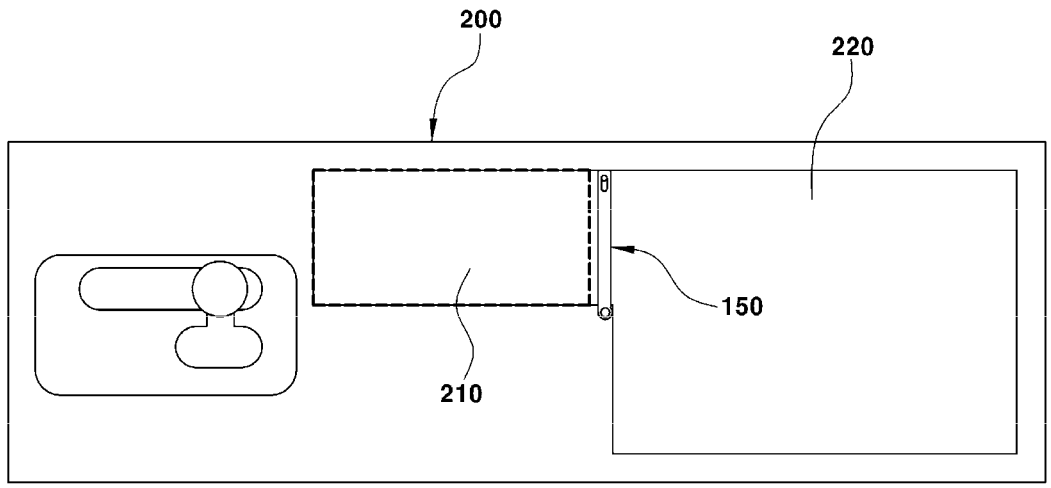
[ Cup holder separation (shutter guide closure) ]

【FIG. 11D】
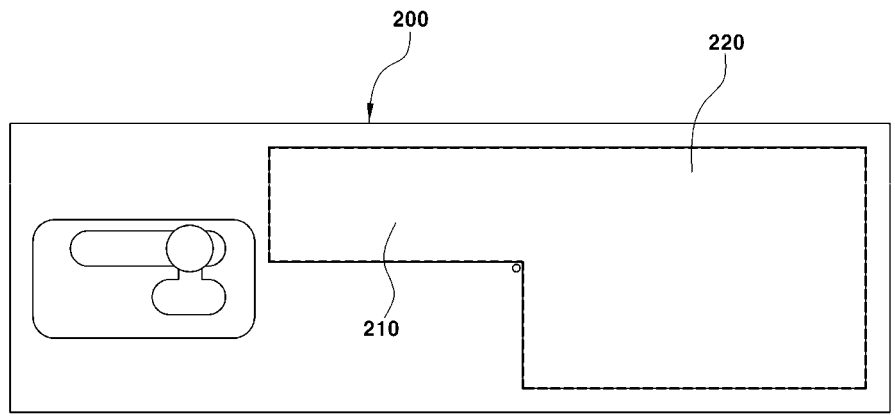
[ Cup holder / shutter guide separation ]
【FIG. 12A】
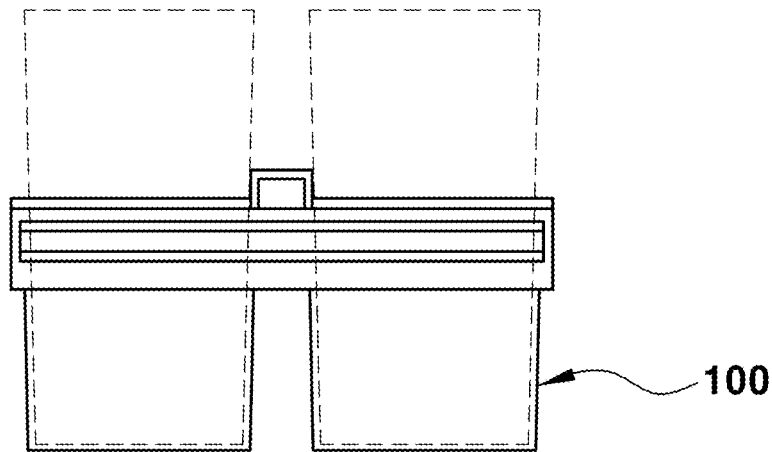

[FIG. 12B]
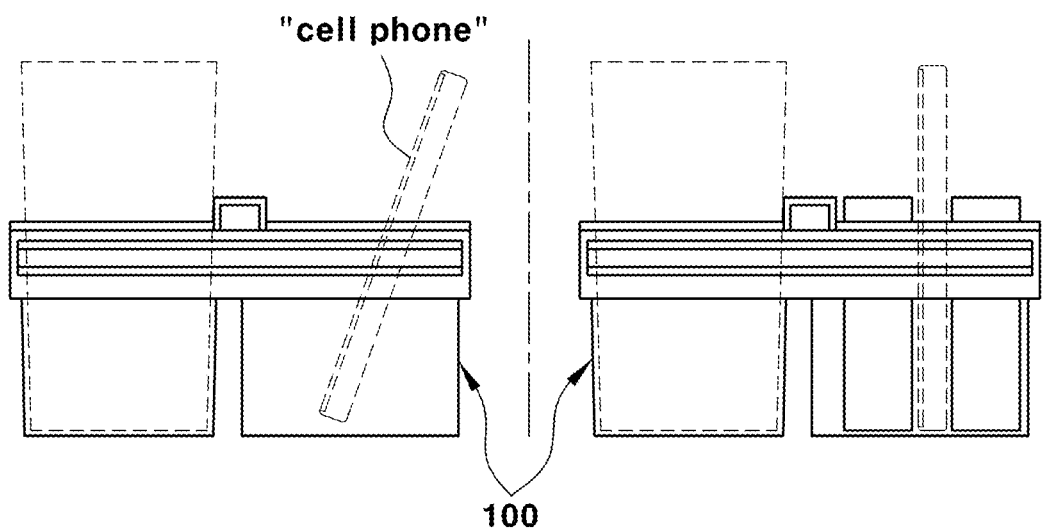
[FIG. 12C]
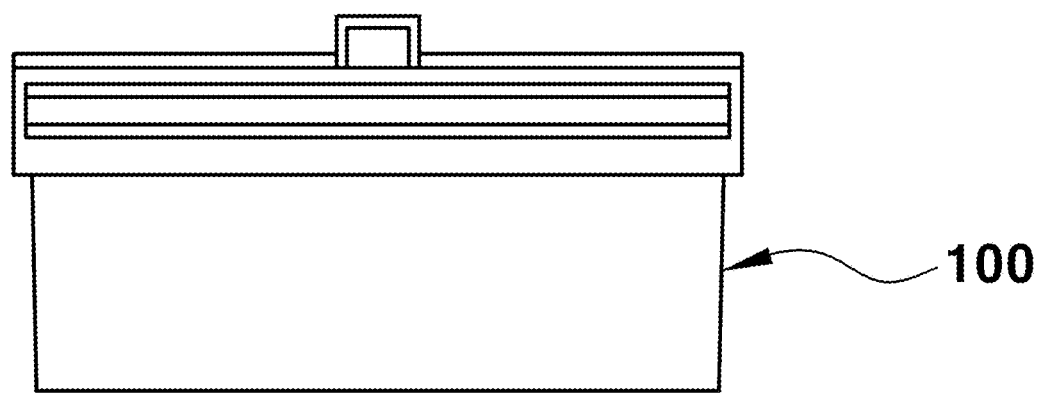

【FIG. 12D】
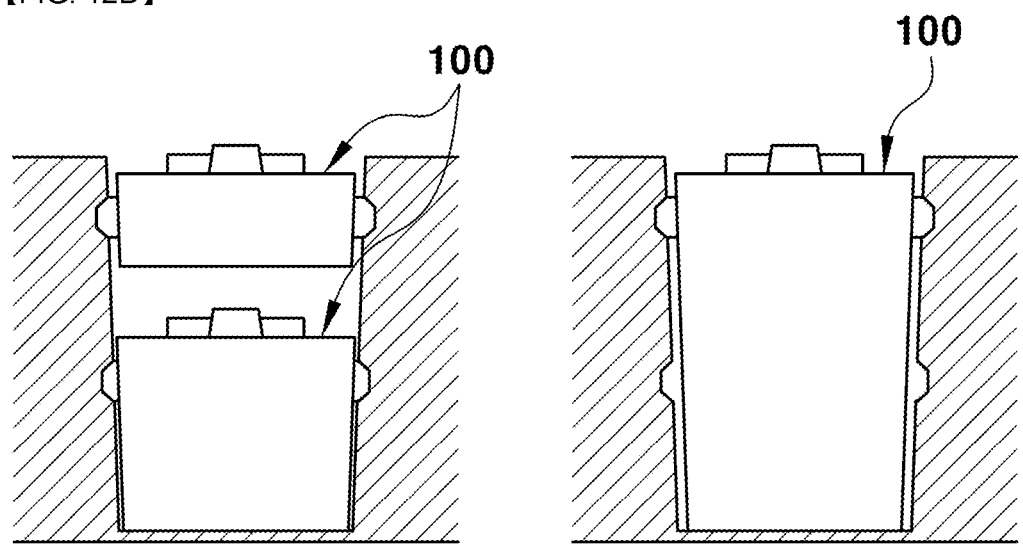
【FIG. 12E】
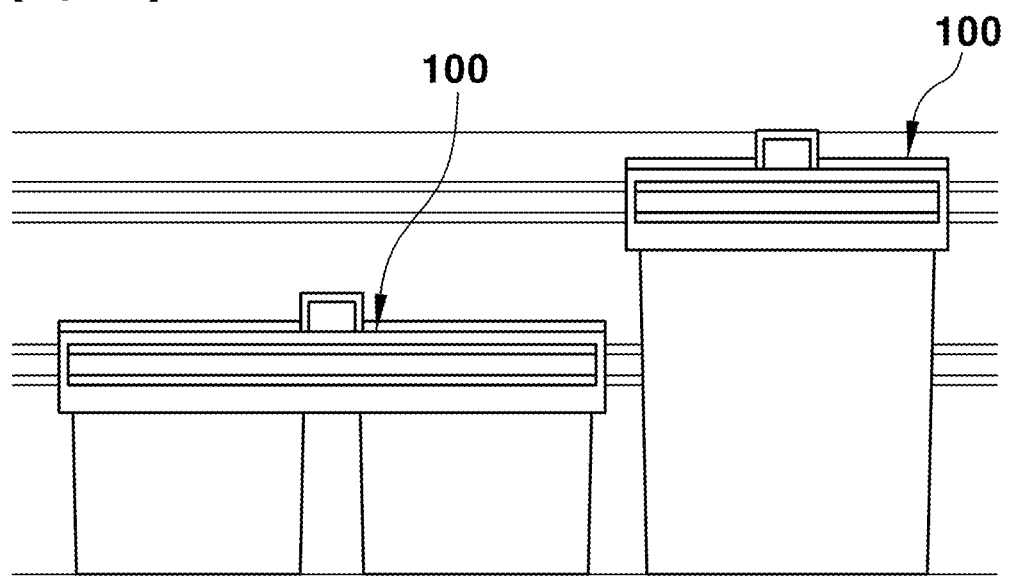

[FIG. 13]
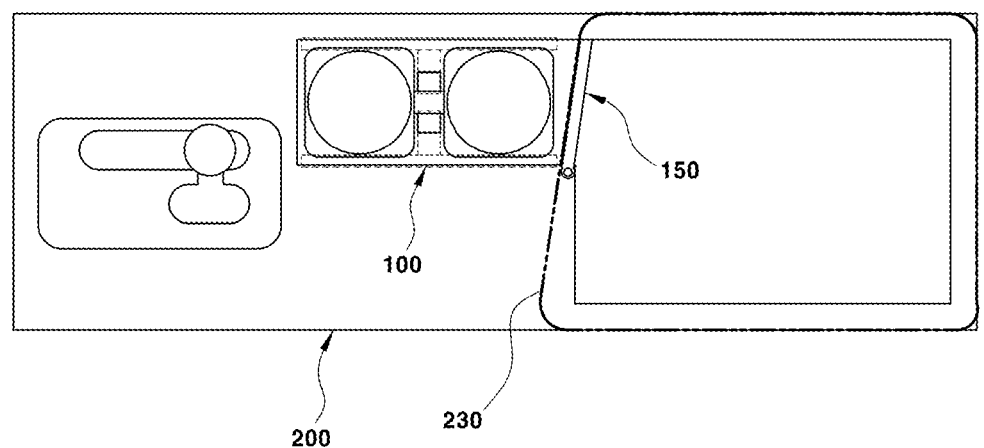

CONSOLE HAVING A CUP HOLDER

CROSS-REFERENCE TO RELATED APPLICATION

This application claims under 35 U.S.C. § 119(a) the benefit of priority to Korean Patent Application No. 10-2018-0103170 filed on Aug. 31, 2018, the entire contents of which are incorporated herein by reference.

BACKGROUND

(a) Technical Field

The present disclosure relates to a cup holder. More specifically, the present disclosure relates to a console of a vehicle having a cup holder with a structure capable of adjusting a height and a front and rear position of the cup holder.

(b) Description of Related Art

Generally, a center console is installed in a space between the driver's seat and the front passengers seat in the interior of the vehicle. A cup holder is integrally formed or detachably mounted to the center console.

Most conventional center console cup holders have been provided with one or two pre-designed specifications. However, finding a space for installing the cup holder in the center console is difficult because the layout of the console is complicated with the inclusion of a wireless charger pad for a mobile phone, a gear knob, a storage space, etc. in addition to the cup holder.

Therefore, the size of the beverage container capable of being stored by the cup holder is limited.

In addition, the height of the console has been increased to enhance interior decoration and practicality. When a beverage container is stored in a cup holder in a high-height console, the driver's arm may be inconveniently caught on the top of the beverage container when the driver operates the gear knob or the air conditioning button.

On the other hand, if the cup holder provided in the console is deep, it is inconvenient to insert or withdraw a cup having a low height, such as a paper cup.

The above information disclosed in this Background section is only for enhancement of understanding of the background of the disclosure. Therefore, this information may not form the prior art that is already known in this country to a person of ordinary skill in the art.

SUMMARY OF THE DISCLOSURE

Accordingly, the present disclosure has been made to solve the above problems. The objects thereof are to provide a console having a cup holder in which the mounting height of a separable cup holder can be adjusted depending on the height of the beverage container to be stored. The position of the separable cup holder can be slidingly moved to store the beverage container with a large volume and diameter and a small volume and diameter by allowing the separable cup holder to be coupled to the console space, such that the height and front and rear positions are adjustable.

A console having a cup holder according to the present disclosure, in order to achieve the above objects, may include a separable cup holder including a holder body at which a holder portion having a predetermined depth is formed, a button disposed to be pressed at the holder body, a slider formed integrally with a lower portion of the button and mounted to be pressed at an outside of the holder body, and a cup holder tray provided with a slide groove at an inner wall surface thereof along a longitudinal direction.

Two or more rows of slide grooves having different heights relative to each other may be formed at the inner wall surface of the cup holder tray along the longitudinal direction. The slider of the separable cup holder may be coupled to be separable to a selected one of the slide grooves for height adjustment.

Further, a button exiting and entering block, in which a button exiting and entering openings are formed at both sides thereof, may be formed at an upper portion of the holder body. A slider exiting and entering opening, through which the slider integrally formed with the button exits and enters, may be formed at both side surfaces of the holder body.

Furthermore, a spring may be connected between two buttons in an inner space of the button exiting and entering block.

In another embodiment of the present disclosure, a shutter, which allows or limits the position movement of the slider of the separable cup holder, may be further mounted to be opened and closed between the cup holder tray and a console tray that is opened and closed by an armrest.

Slide extension grooves, which the slider of the separable cup holder moves from the slide groove of the cup holder tray to be inserted into, may be formed on one surface of the shutter and one side wall surface of the console tray.

An upper hinge groove and a lower hinge groove, which become rotation points of the shutter, may be formed at a position between the cup holder tray and the console tray. An upper hinge pin and a lower hinge pin, which are inserted to be separable into the upper hinge groove and the lower hinge groove, may be formed at an upper portion and a lower portion of one side end portion, thereby being the rotation points of the shutter.

A guide groove, in which a spring is disposed, may be formed at a lower portion of the one side end portion of the shutter. The lower hinge pin may be connected with the spring and inserted into and coupled to the spring to be protruded from the guide groove.

The slide grooves and the slide extension grooves may be arranged to be aligned with each other so that the slider of the separable cup holder can move when the shutter is opened.

In addition, a locking groove, in which a spring is disposed, may be formed at the other end portion of the shutter. A locking pin may be connected with the spring in the locking groove and inserted into and coupled to the spring to be protruded from the other end portion of the shutter.

Through the above-mentioned solutions to the noted problems, the present disclosure provides the following effects.

First, adjustment of the mounting height of the separable cup holder depending on the height of the beverage container to be stored is possible by allowing the separable cup holder to be supported such that the height and front and rear positions in the console space, including the cup holder tray and the console tray, are adjustable.

Second, firmly accommodating a beverage container with a large height is possible by adjusting the mounting height of the separable cup holder to a low level by adjusting the receiving depth of the beverage container. In addition, prevention of the drivers arm from interfering with the beverage container when the driver operates the gear knob or the air conditioning button is possible.

Third, widely securing a space (a tray space for the cup holder after the separable cup holder is slidingly moved) for accommodating a beverage container having a large volume and diameter and a small volume and diameter is possible by slidingly moving the position of the separable cup holder toward the console tray, which is opened and closed by the armrest.

Other aspects and embodiments of the disclosure are discussed infra.

It is understood that the term "vehicle", "vehicular", or other similar terms as used herein are inclusive of motor vehicles in general such as passenger automobiles, including sports utility vehicles (SUV), buses, trucks, various commercial vehicles, watercraft, including a variety of boats and ships, aircraft, and the like, hybrid vehicles, electric vehicles, plug-in hybrid electric vehicles, hydrogen-powered vehicles, and other alternative fuel vehicles (e.g. fuels derived from resources other than petroleum). As referred to herein, a hybrid vehicle is a vehicle that has two or more sources of power, for example both gasoline-powered and electric-powered vehicles.

The above and other features of the disclosure are discussed infra.

BRIEF DESCRIPTION OF THE DRAWINGS

The above and other features of the present disclosure will now be described in detail with reference to certain embodiments thereof illustrated in the accompanying drawings, which are given herein below by way of illustration only and are not limitative of the present disclosure, and wherein:

FIG. 1 is a plan view showing a separable cup holder according to the present disclosure;

FIG. 2 is a side view showing the separable cup holder according to the present disclosure;

FIG. 3 is a plan view showing a state in which the separable cup holder according to the present disclosure is seated on a console;

FIG. 4 is a cross-sectional view showing a state in which the separable cup holder according to the present disclosure is seated on the console;

FIG. 5 is a cross-sectional view showing the process of adjusting the height of the separable cup holder according to the present disclosure;

FIG. 6 is a plan view showing a configuration for adjusting the front and rear positions of the separable cup holder according to the present disclosure;

FIG. 7 is a perspective view showing a shutter shown at FIG. 6;

FIG. 8 is a cross-sectional view showing the rotation shaft structure of the shutter shown in FIG. 6;

FIG. 9 and FIG. 10 are a perspective view and a plan view showing the front and rear position adjustments of the separable cup holder according to the present disclosure;

FIGS. 11A-11D are plan views showing an example of use of the console having the cup holder according to the present disclosure;

FIGS. 12A-12E are cross-sectional views showing a variation of the console having the cup holder according to the present disclosure; and FIG. 13 is a schematic diagram showing an example in which the installation direction of the shutter is parallel to the front end line of an armrest in the configuration of the present disclosure.

It should be understood that the appended drawings are not necessarily to scale, presenting a somewhat simplified representation of various features illustrative of the basic principles of the disclosure. The specific design features of the present disclosure as disclosed herein, including specific dimensions, orientations, locations, and shapes, will be determined in part by the particular intended application and use environment.

In the figures, reference numbers refer to the same or equivalent parts of the present disclosure throughout the several figures of the drawing.

DETAILED DESCRIPTION

Hereinafter, reference will now be made in detail to various embodiments of the present disclosure, examples of which are illustrated in the accompanying drawings and described below. While the disclosure describes various embodiments, it will be understood that the present description is not intended to limit the disclosure to those embodiments. On the contrary, the disclosure is intended to include various alternatives, modifications, equivalents, and other embodiments, which may be included within the spirit and scope of the disclosure as defined by the appended claims.

In the whole description, it will be understood that when a component is referred to as "comprising" any component, it does not exclude other components and can further include the other components unless otherwise specified.

FIG. 1 to FIG. 4 shows a separable cup holder according to the present disclosure and a state in which it is seated on a console. In each drawing, reference numeral 100 indicates a separable cup holder. Reference numeral 200 indicates a console.

The separable cup holder 100 may include a holder body 110 having two or more holder portions 112 formed at front and rear positions thereof as a skeleton. The holder portions 112 may be concavely formed at a predetermined depth into which a bottom portion of a beverage container and the like is inserted.

Further, a button exiting and entering block 114 of a hollow shape may be formed at an upper surface portion of the holder body 112, such as a position between two holder portions 112. A button exiting and entering opening 116, through which a button 120 enters and exits, may be formed on both sides of the button exiting and entering block 114.

Furthermore, a slider exiting and entering opening 132, through which a slider 130 enters and exits, may be formed at both side surfaces of the holder body 112.

The button 120 and the slider 130 may be provided as a pair of integral structures.

For example, the slider 130 may be integrally formed to be vertically bent from a lower end portion of the button 120.

As the button 120 and the slider 130 are provided as an integral structure, the button 120 is arranged at the button exiting and entering opening 116. The slider 130 is arranged in the slider exiting and entering opening 132.

A spring 140 is connected to be compressible between two buttons 120 arranged on both sides of the button exiting and entering block 114.

Accordingly, when the two buttons 120 are pressed together, the spring 140 is compressed. Both buttons 120 are moved into the button exiting and entering block 114 through the button exiting and entering opening 116. The slider 130 is moved into the slider exiting and entering opening 132 simultaneously.

Releasing the pressing force on the buttons 120 causes the buttons 120 to return out of the button exiting and entering opening 116 due to the elastic restoring force of the spring 140. Simultaneously, the slide 130 is also returned out of the slider exiting and entering opening 132.

The console 200 may be mounted between the driver's seat and the front passenger's seat. A front side of the cup holder tray 210 may be formed. A console tray 220 opened and closed by an armrest 230 (as shown in FIG. 13) may be formed at the rear of the cup holder tray 210.

At least two rows of slide grooves 212 may be formed along the longitudinal direction on both inner wall surfaces of the cup holder tray 210. Each slide groove 212 may be arranged at a predetermined distance in the up and down direction.

Accordingly, the separable cup holder 100 may be coupled to the cup holder tray 210 in a height-adjustable manner.

The slider 130 may be inserted into a selected one of the slide grooves 212 of the cup holder tray 210 to adjust the height of the separable cup holder 100.

Referring to FIG. 5, the separable cup holder 100 can be inserted into the cup holder tray 210. After pressing the two buttons 120 so that each button 120 is moved into the button exiting and entering block 114 through the button exiting and entering opening 116 and moving the slider 130 simultaneously into the slider exiting and entering opening 132, the mounting height of the separable cup holder 100 in the cup holder tray 210 can be adjusted upward by releasing the pressing force on two buttons 120 to insert and couple the slider 130 to the upper slide groove 212.

Accordingly, the height of the holder body 110 of the separable cup holder 100 and the position of the holder portion 112 is upwardly adjusted so that the user can smoothly and conveniently carry out the operation of inserting and retracting the beverage container (e.g., a paper cup) of a low height into and from the holder portion 112.

The mounting height of the separable cup holder 100 is adjusted downward into the cup holder tray 210 by releasing the pressing force on two buttons 120 and inserting the slider 130 into the lower slide groove 212 to be coupled thereto.

Accordingly, the height of the holder body 110 of the separable cup holder 100 and the position of the holder portion 112 is downwardly adjusted so that the user can insert the beverage container of a high height into the holder portion 112. Thereby, the driver's arm is prevented from touching the beverage container or the like when the driver operates the gear knob or the air conditioning button.

FIG. 6 to FIG. 8 represent a configuration for adjusting the front and rear positions of the separable cup holder according to the present disclosure. In each drawing reference, numeral 150 indicates a shutter.

The shutter 150 serves to distinguish between the cup holder tray 210 and the console tray 220, which is opened and closed by the armrest 230 at the closed position, and serves to guide the forward and backward position adjustment of the separable cup holder 100 at the open position.

As shown in FIG. 6, the shutter 150 may be mounted to be opened and closed at a boundary position between the cup holder tray 210 and the console tray 220 so as to distinguish the cup holder tray 210 and the console tray 220. Simultaneously, the shutter 150 limits position movement of the slider 130 of the separable cup holder 100 in the close position and allows the slider 130 of the separable cup holder 100 to be moved in the open position.

As shown in FIG. 7, a slide extension groove 160 may be formed on one surface of the shutter 150, which coincides with the slide groove 212 of the cup holder tray 210. The slide extension groove 160 may also be formed on one wall surface of the console tray 220 facing the one surface of the shutter 150. The slider 130 of the separable cup holder 100 may be moved and inserted into the slide extension groove 160 from the slide groove 212 of the cup holder tray 210.

Further, for opening and closing rotation of the shutter 150, as shown in FIG. 8, an upper hinge groove 214 and a lower hinge groove 216 may be formed at one edge of the boundary between the cup holder tray 210 and the console tray 220, which are rotation points. An upper hinge pin 151 and a lower hinge pin 152, which are detachably inserted into the upper hinge groove 214 and the lower hinge groove 216, respectively, may be formed to be protruded at an upper portion and a lower portion of one side end portion of the shutter 150, which are rotation points of the shutter 150.

Rotating the shutter 150 to an open state is shown in FIG. 9. The slide groove 212 and the slide extension groove 160 are arranged so as to be linearly aligned with each other so that the slider 130 of the separable cup holder 100 can be moved back and forth.

Therefore, by pushing the separable cup holder 100 rearward, the slider 130 is moved from the slide groove 212 to the slide extension groove 160, as shown in FIG. 10. The separable cup holder 100 is moved toward the console tray 220, so that a space for accommodating a beverage container with a large volume and diameter (e.g., a tumbler) and a small volume and diameter (the front space of the cup holder tray 210 after the separable cup holder is slidingly moved) can be widely secured.

For the separation of the shutter 150, as shown in FIG. 8, a guide groove 154 into which a spring 153 is inserted may be formed at a bottom portion of one end of the shutter 150. The lower hinge pin 152 may be inserted into the guide groove 154 to be connected with and coupled to the spring 153 so as to be protruded therefrom.

Accordingly, the lower hinge pin 152 is inserted into the guide groove 154 while compressing the spring 153 to separate the shutter 150 by pressing an upper portion of the shutter 150 to pressurize the lower hinge pin 152. Thereby, the cup holder tray 210 and the console tray 220 may be utilized as one space.

The shutter 150 should be maintained in a firm closed position to separate the cup holder tray 210 and the console tray 220 into separate spaces.

In order to fix the shutter 150 in the closed position, the other end portion of the shutter 150 may be formed with a locking groove 157 having a spring 156 therein. A locking pin 158 may be connected to the spring 156 and inserted into and coupled to locking groove 157, so as to be protruded therefrom.

The lock pin 158 is in close contact with the inner wall surface of the boundary between the cup holder tray 210 and the console tray 220, while being protruded by the elastic restoring force of the spring 156, at the closed position of the shutter 150 so that the shutter 150 does not move at the closed position. Accordingly, the shutter 150 can be firmly fixed without being moved in the closed position.

The separable cup holder of the present disclosure can be used and modified in various ways. Use and modification examples will be described as follows.

FIGS. 11A-11D show various examples of use of a console having a cup holder according to the present disclosure.

As shown in FIG. 11A, the cup holder tray 210 and the console tray 220 are separated into separate spaces at the closed position of the shutter 150 as described above. The separable cup holder 100 can be seated on the cup holder tray 210 to be used as described above.

As shown in FIG. 11B, the front space of the cup holder tray can secure a space for accommodating a beverage container with a large volume and diameter (e.g., a tumbler) or a beverage container with a small volume and diameter, as well as other small things or items, by slidingly moving the separable cup holder 100 toward the console tray 220 in the opened position of the shutter 150 as described above.

As shown in FIG. 11C, separation of the separable cup holder 100 from the cup holder tray 210 is possible when not in use. The cup holder tray 210 and the console tray 220, which are separated from each other at the closed position of the shutter 150, can be exclusively used for respective housings.

As shown in FIG. 11D, separating the separable cup holder 100 and the shutter 150 allows the cup holder tray 210 and console tray 220 to be used as a single storage space.

FIGS. 12A-12E show a variation example of the console having a cup holder according to the present disclosure.

As shown in FIG. 12A, the separable cup holder 100 can be applied to a structure in which two or more holder portions 112 are formed, as shown in FIG. 12B. Alternatively, the separable cup holder 100 can be applied to a structure having one holder portion 112 and another holder portion (e.g., a cell phone holder tray). As shown in FIG. 12C, the separable cup holder 100 can be applied to a structure having one wide tray.

Also, as shown in FIG. 12D, the separable cup holder 100 can be divided into two low-height structures to dispose up or down part apart from each other. The low height structures can be disposed alone as a single high-height structure.

Further, as shown in FIG. 12E, separable cup holders 100 having different heights can be separately provided to be disposed together along the longitudinal direction.

The armrest 230 that opens and closes the upper portion of the console tray 220 can be designed in different shapes for different types of vehicles. As shown in FIG. 13, the front end portion of the armrest 230 may be applied in a diagonal shape. In this case, the rear surface of the separable cup holder 100 and the installation direction of the shutter 150 can be applied in parallel to the front diagonal line of the armrest 230.

What is claimed is:

1. A console having a cup holder, the console comprising:
a separable cup holder including
a holder body having a holder portion with a predetermined depth,
a button disposed on the holder body and configured to be pressed, and
a slider formed integrally with a lower portion of the button and mounted to be pressed at an outside of the holder body; and
a cup holder tray provided with a slide groove along a longitudinal direction on an inner wall surface thereof and receiving the holder body to be movable up and down along the inner wall surface.

2. The console of claim 1, wherein:
the cupholder tray includes two or more rows of slide grooves having different heights from each other formed along the longitudinal direction on the inner wall surface; and
the slider of the separable cup holder is coupled to be separable to a selected one of the slide grooves for height adjustment.

3. The console of claim 1 further comprising:
a button exiting and entering block formed at an upper portion of the holder body, the button exiting and entering block having button exiting and entering openings formed at both sides thereof; and
a slider exiting and entering opening formed at both side surfaces of the holder body, wherein the slider integrally formed with the button exits and enters through the slider exiting and entering opening.

4. The console of claim 3 further comprising:
another button disposed on the holder body and configured to be pressed; and
a spring connected between the button and the other button in an inner space of the button exiting and entering block.

5. A console having a cup holder, the console comprising:
a separable cup holder including
a holder body having a holder portion with a predetermined depth,
a button disposed on the holder body and configured to be pressed, and
a slider formed integrally with a lower portion of the button and mounted to be pressed at an outside of the holder body; and
a cup holder tray provided with a slide groove along a longitudinal direction on an inner wall surface thereof,
wherein a shutter, which allows or limits the position movement of the slider of the separable cup holder, is further mounted to be opened and closed between the cup holder tray and a console tray opened and closed by an armrest.

6. The console of claim 5, wherein slide extension grooves are formed on one surface of the shutter and one side wall surface of the console tray, wherein, the slider of the separable cup holder can move from the slide groove of the cup holder tray into the slide extension grooves.

7. The console of claim 6, wherein the slide grooves and the slide extension grooves are arranged to be aligned with each other so that the slider of the separable cup holder can move when the shutter is opened.

8. The console of claim 5, wherein:
an upper hinge groove and a lower hinge groove, which become rotation points of the shutter, are formed at a position between the cup holder tray and the console tray; and
an upper hinge pin and a lower hinge pin, which are inserted to be separable into the upper hinge groove and the lower hinge groove, are formed at an upper and a lower portions of one side end portion being the rotation points of the shutter.

9. The console of claim 8, further comprising:
a guide groove formed at the lower portion of the one side end portion of the shutter; and
a spring disposed in the guide groove,
wherein the lower hinge pin is coupled to the spring and configured to be protruded from the guide groove.

10. The console of claim 5, further comprising:
a locking groove formed at an end portion of the shutter;
a spring disposed in the locking groove; and
a locking pin coupled to the spring in the locking groove and configured to be protruded from the end portion of the shutter.

* * * * *